Aug. 26, 1958    R. L. SNYDER    2,849,624
SATURABLE REACTANCE CIRCUITS
Filed Aug. 31, 1956    5 Sheets-Sheet 1

*INVENTOR.*
RICHARD L. SNYDER
BY Alfred W. Barber
*ATTORNEY*

Aug. 26, 1958   R. L. SNYDER   2,849,624
SATURABLE REACTANCE CIRCUITS
Filed Aug. 31, 1956   5 Sheets-Sheet 2

*INVENTOR.*
RICHARD L. SNYDER
BY *Alfred W. Barber*
ATTORNEY

*INVENTOR.*
RICHARD L. SNYDER
BY
Alfred W. Barber
*ATTORNEY*

Aug. 26, 1958  R. L. SNYDER  2,849,624
SATURABLE REACTANCE CIRCUITS
Filed Aug. 31, 1956  5 Sheets-Sheet 4

INVENTOR.
RICHARD L. SNYDER
BY
Alfred W. Barber
ATTORNEY

Aug. 26, 1958  R. L. SNYDER  2,849,624
SATURABLE REACTANCE CIRCUITS
Filed Aug. 31, 1956  5 Sheets-Sheet 5

*INVENTOR.*
RICHARD L. SNYDER
BY *Alfred W. Barber*
*ATTORNEY*

United States Patent Office 2,849,624
Patented Aug. 26, 1958

2,849,624

SATURABLE REACTANCE CIRCUITS

Richard L. Snyder, Moorestown, N. J.

Application August 31, 1956, Serial No. 607,441

3 Claims. (Cl. 307—88)

The present invention concerns trigger circuits and, in particular, trigger circuits, magnetic toggles, flip-flops, counters and shift register circuits employing saturable reactors.

In the past flip-flop circuits have been utilized in a number of ways. Flip-flop circuits may generally be described as circuits which exhibit two conditions of stability and which can be switched from one condition to the other in a predetermined manner as by the application of an electrical pulse of current or voltage. Flip-flop circuits have been utilized for switching purposes, for gating, for various types of counters and shift registers. Many flip-flop circuits have been devised utilizing thermionic vacuum tubes and their use is familiar and well understood in the art. The present invention concerns the use of saturable reactors in flip-flop circuits providing more stable, trouble-free, long life operation than conventional circuits. While the saturable reactor may not be directly substituted for the vacuum tube it has been found that circuits may be devised which give substantially equivalent performance. The present invention is concerned with these circuits whereby the saturable reactor may be utilized in basic flip-flop circuits and many of their applications.

Accordingly one object of the present invention is to provide flip-flop circuits utilizing saturable reactors.

Another object is to provide a method of and means for utilizing saturable reactors in flip-flop circuits and the like.

Still another object is to provide saturable reactor flip-flop circuits and the like having high speed response suitable for use in counters and the like.

A further object is to provide binary and ring counter circuits utilizing saturable reactors and exhibiting high speed response.

A still further object is to provide saturable reactor flip-flop, counter, shift register and similar circuits of great reliability, extremely long life and low maintenance cost.

These and other objects of the present invention will be apparent from the detailed description of the invention given in connection with the various figures of the drawing.

In the drawing.

Figure 1:
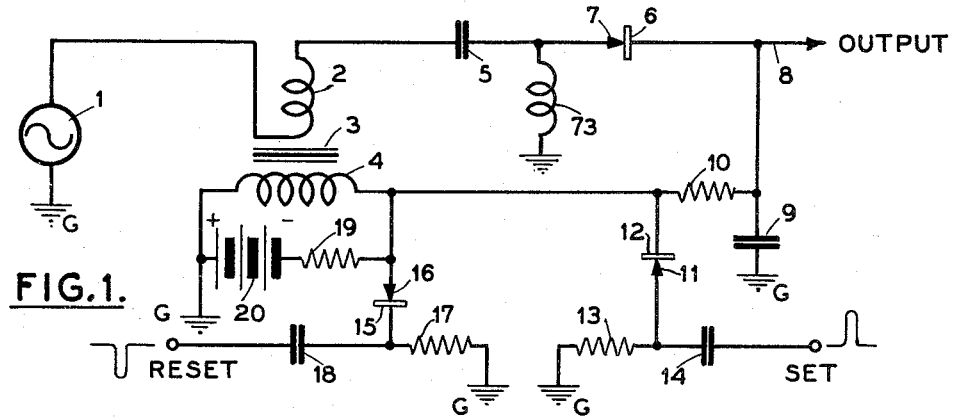
Fig. 1 shows a flip-flop circuit in accordance with the present invention.

Fig. 1 shows a flip-flop circuit in which saturable reactor 2—3—4 is utilized. Signal current at a frequency of the order of 15 megacycles is supplied from generator 1 to signal coil 2 from which it passes through capacitor 5 across choke 31 to rectifier 6—7 and then out to a further utilization means over lead 8. Signal current passed by coil 2 and rectified by rectifier 6—7 provided a direct current voltage drop across capacitor 9. Capacitor 9 serves as a filter to remove the signal frequency current from the feed-back regenerating current. Capacitor 9 may also be varied to affect the time constant of the regenerative circuit. This voltage across capacitor 9 is applied to control coil 4 through resistor 10. The high side of capacitor 9 will be positive with respect to ground. A small negative bias current to counteract the "off" signal current is supplied from negative voltage source 20 through current limiting resistor 19. Setting pulses having a positive polarity are utilized to turn the circuit on. The setting pulses are applied through capacitor 14 across resistor 13 and through rectifier 11—12 to the high side of signal coil 2. Resetting pulses having a negative polarity are utilized to turn the circuit off. The resetting pulses are applied through capacitor 18 across resistor 17 and through rectifier 15—16. Rectifiers 11—12 and 15—16 are connected to pass the set and reset pulses respectively and prevent disturbances of opposite polarity from getting into the circuit. Assuming the circuit is initially off, little or no current flows in signal coil 4 so that no saturation exists in coil 3, signal coil 2 has a high impedance passing little signal current from source 1 to rectifier 6—7 and output point 8. The small residual signal passed by coil 2 and rectified by rectifier 6—7 passes a small direct current through resistor 10 and control coil 4 may be balanced out by the negative current from voltage source 20 through resistor 19. To turn the circuit "on" a positive "set" pulse is applied through capacitor 14 across resistor 13 and through rectifier 11—12 to control coil 4 where this setting pulse current establishes saturation momentarily of core 3. When core 3 thus becomes saturated, the impedance of signal coil 2 is dropped to a low value permitting current from high frequency source 1 to flow through capacitor 5 and rectifier 6—7 to build up a voltage across capacitor 9. The voltage thus established across capacitor 9 passes direct current through resistor 10 and thence through control coil 4. This current reenforces the current supplied by the set pulse and is regenerative in effect. This current also increases the saturation of core 3 further reducing the impedance of coil 2 causing more current to flow from source 1 and again producing a regenerative build-up. Finally a tight hold condition is established so that the circuit remains "on" when the set pulse has passed and signal current is continuously passed to the output 8. In order to switch the circuit back to the initial "off" condition, a negative "reset" pulse is applied through capacitor 18 across resistor 17 and through rectifier 15—16 to control coil 4. The negative current thus passed through control coil 4 decreases the saturation in core 3 increasing the impedance of coil 2 and decreasing the signal passed from source 1, to rectifier 6—7 and output 8 and decreasing the current through resistor 10 and control coil 4 in the positive direction. This action will be seen to be regenerative also, and finally, results in reestablishing the initial condition of minimum saturation in core 3 and minimum signal passed to the holding circuit and the output 8, even after the reset pulse has passed. This "off" condition will then maintain itself until the next "set" pulse is applied to the circuit. This then is a circuit commonly called a flip-flop circuit, for switching a signal on or off in response to a set or reset signal respectively.

Figure 2:
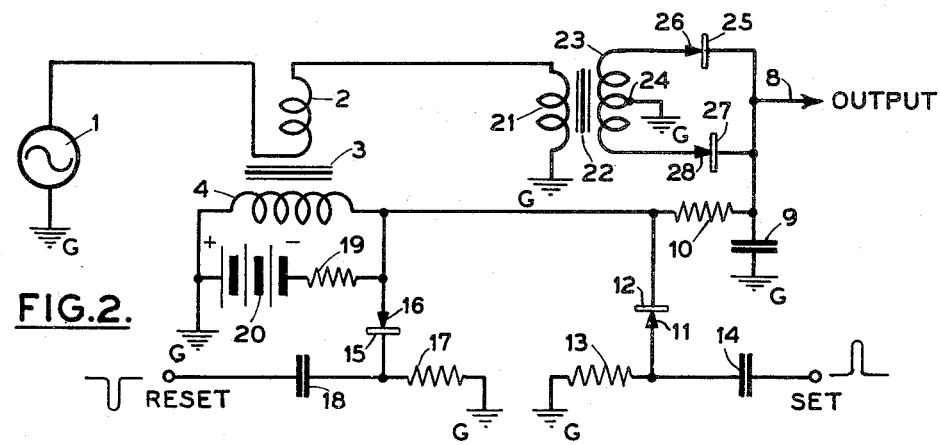
Fig. 2 shows a modified form of flip-flop circuit according to the present invention.

Fig. 2 is also a flip-flop circuit which operates in a manner similar to the operation of Fig. 1 except that somewhat increased efficiency and sensitivity is provided in utilizing the two diodes 25—26 and 27—28 in place of the single diode 6—7 and transformer 21—22—23—24 in place of the impedance coupling of capacitor 5 and choke coil 31.

Figure 3:
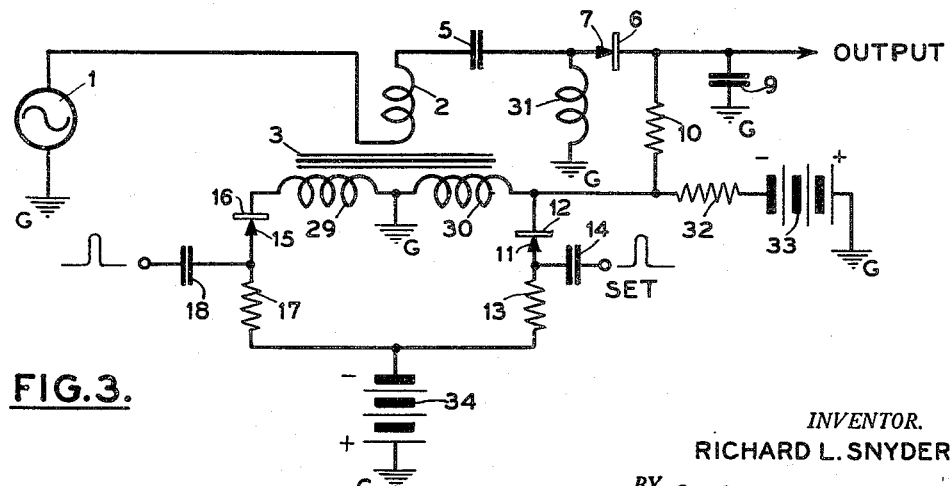
Fig. 3 shows a further modified form of flip-flop.

Fig. 3 is a flip-flop similar to Fig. 1 but with modifications which permit switching on and off with pulses of the same polarity. The setting or turning on of the circuit is carried out in a manner similar to the operation of the circuit of Fig. 1 and utilizing control coil 30. In order to reset or reestablish the off condition, a positive pulse is applied through capacitor 18, across resistor 17, through rectifier 15—16 to a second control coil 29 connected so that positive pulse current through it reduces the saturation in core 3 due to positive current in coil 30. A negative bias from source 34 may be applied to rectifier 11—12 and 15—16 through resistors 13 and 17 respectively which permits only the peaks of the set and reset pulses to act on the circuit and thereby making the circuit less sensitive to disturbances from the sources of set and reset pulses.

It should be seen that the polarity of the set and reset pulses utilized in Figs. 1, 2 and 3 may be reversed by reversing the connections of all diodes in the various circuits.

Figure 4:
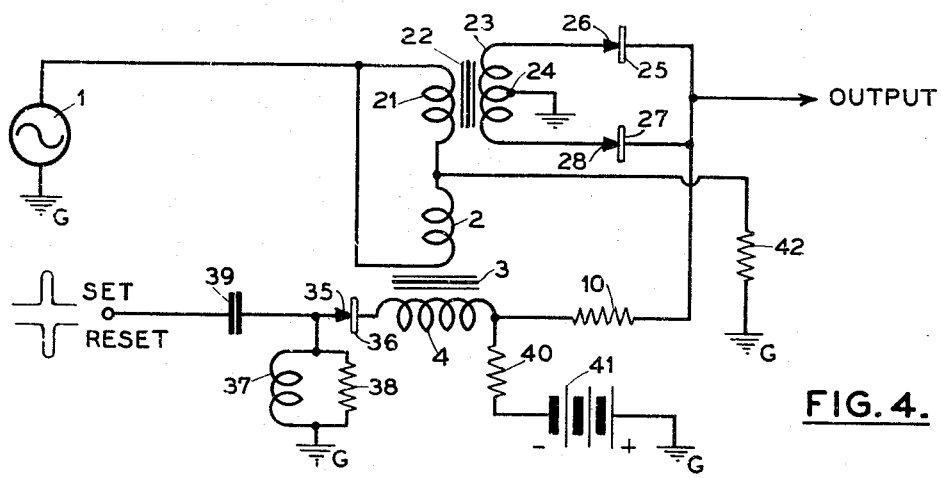
Fig. 4 shows a still further modified form of flip-flop.

Fig. 4 shows a modification of the flip-flop circuits described above in that it provides an output signal or "on" condition when core 3 is unsaturated. The "off" condition exists when signal current flows from source 1 through signal coil 2, which has a low impedance due to saturation of core 3. A positive pulse at the set-reset terminal passes through capacitor 39 developing a voltage across coil 37 shunted by resistor 38 which then passes through rectifier 35—36 reducing the current from battery 41 through resistor 40 and control coil 4. This reduces saturation in core 3 increasing the impedance of coil 2 and reduces the signal voltage across primary 21 of transformer 21—22—23—24.

This reduces current supplied through rectifiers 25—26 and 27—28 and resistor 10 to control coil 4 regenerating the effect of the set pulse until coil 2 attains maximum impedance and maximum output voltage is developed across resistor load 42. If then a negative reset pulse is applied, current from battery 41 again flows through control coil 4 and the situation is reversed returning the circuit to its initial condition. Both "on" and "off" conditions are automatically maintained.

Figure 5:
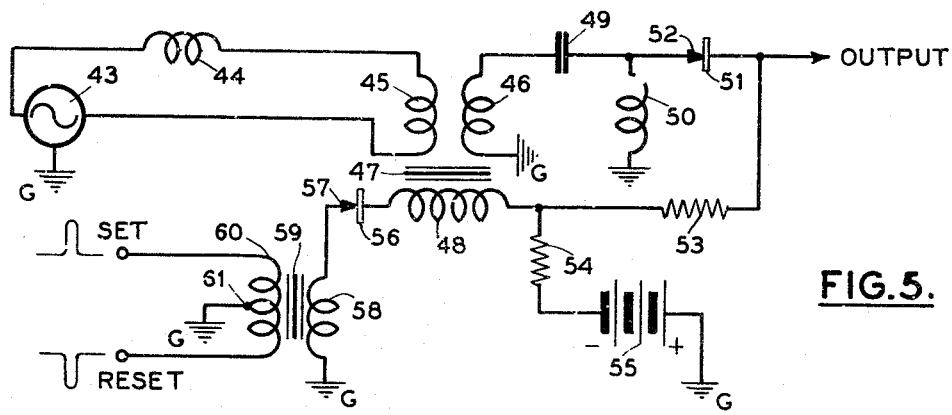
Fig. 5 shows still another modified form of flip-flop.

The circuit of Fig. 5 operates in a manner similar to Fig. 4. Core 47 carries control coil 48 and signal coil 45 with a third coil 46 coupled to give a transformer action to feed the output through coupling capacitor 49 and rectifier 51—52 across choke 50. The R. F. signal is supplied from the balanced source 43 one phase going directly to signal coil 45 and the other side through choke 44. Holding current is supplied to control coil 48 from bias source 55 through resistor 54, rectifier 56—57 and secondary 58 of transformer 53—59—60—61. The hold-on current is supplied through resistor 53. Set and reset signals of opposite polarity are applied to opposite halves of primary 60.

Figure 6:
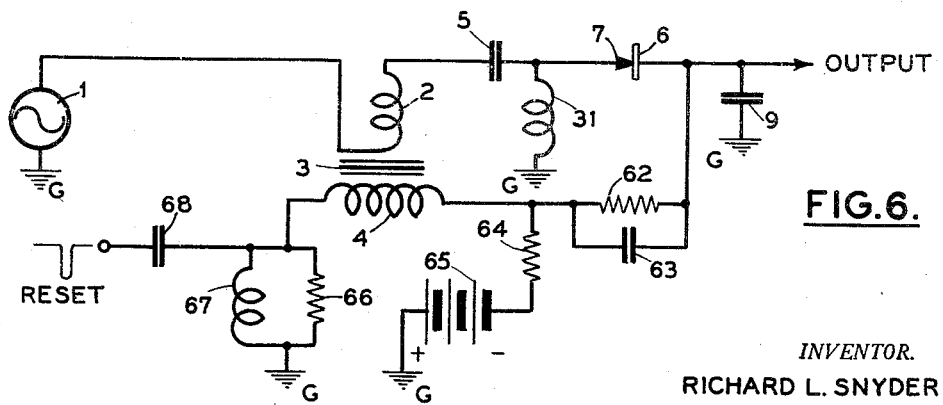
Fig. 6 shows a saturable reactor binary counter circuit in accordance with the present invention.

Fig. 6 is a circuit similar to Fig. 1 but designed to operate as a binary counter stage. Signal current from source 1 flows through signal coil 2, capacitor 5 and rectifier 6—7 across choke 31 to the output across capacitor 9. Holding bias from 65 passes through resistor 64, control coil 4 and choke 67 shunted by damping resistor 66. The rectifier coupling resistor 62 is shunted by capacitor 63 to provide a time constant of slightly greater period than that of the driving pulse. A negative driving pulse is applied through capacitor 68 to the end of control coil 4 not connected to the regenerative system. As shown the pulse, which may be the differentiated output of an identical circuit, is negative and is applied across inductance 67 damped by resistor 66. If no current is flowing in control coil 4, an input pulse will start current to flow causing rectifier 6—7 to produce current in excess of the bias current from 65 and bringing the system to saturation. When saturation exists, the incidence of an additional pulse causes greater saturation to develop and more current to flow which charges time constant capacitor 63 to a high voltage so that when the pulse subsides, the rectifier cathode 7 is so positive that its current is reduced below that necessary to maintain saturation so that the current collapses. At this time, a negative signal can be derived from rectifier 6—7 output through a differentiating condenser to drive another counter stage. It may be desirable, however, to reverse the diode of the succeeding counter stage and to use the differentiated output of the positive excursion of the rectifier cathode 7 for the output. By thus alternating the polarities of successive counter stages, the output pulses can be taken the current increase which is more abrupt than the current decrease. Since this change occurs once for every two inputs pulses, binary scaler action is produced.

Figure 7:
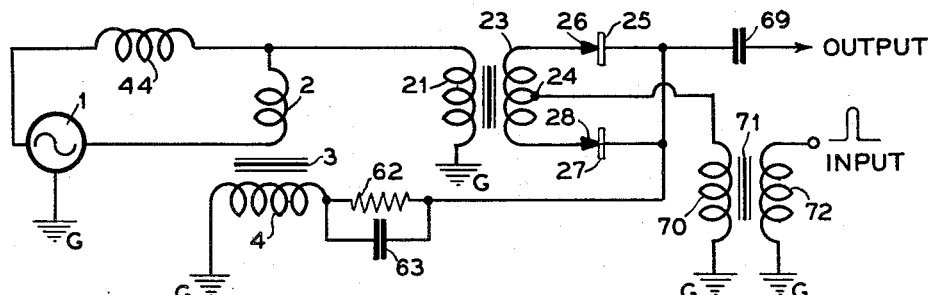
Fig. 7 shows a modified form of saturable reactor binary counter circuit according to the present invention.

The circuit of Fig. 7 is similar to that of Fig. 6 except that the bias source is eliminated. The non-saturation current flowing through coil 2 from source 1 to primary 21 of transformer 21—23—24 is cancelled by an equal and oppositely phased current through inductance 44. Saturation current is provided to hold when core 3 is saturated by rectifiers 25—26 and 27—28 and output is taken through capacitor 69. The input pulse is applied to center-tap 24 by convenient coupling means such as through transformer 70—71—72.

Figure 8:
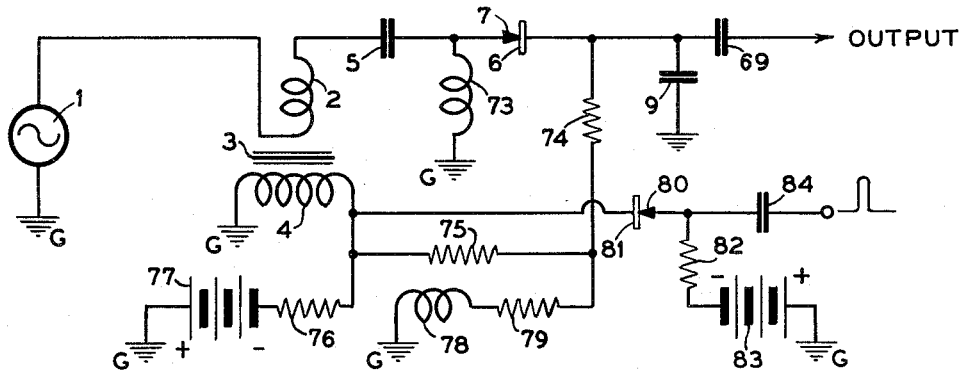
Fig. 8 shows another saturable reactor binary counter circuit in accordance with the present invention.

The circuit of Fig. 8 is somewhat like the circuit of Fig. 6 except that provision is made to store condition information in an inductor rather than a capacitor. Signal current from source 1 passes through signal coil 2, capacitor 5 across inductor 73, rectifier 6—7 to capacitor 9 in shunt and capacitor 69 in series to the output. The holding current from rectifier 6—7 passes through resistors 74 and 75 to control coil 4. Residual current in the unsaturated condition is cancelled by current from source 77 through resistor 76. Shift is caused to take place by means of a positive pulse applied through diode 80—81 which has a bias on it from source 83 through resistor 82. This pulse will develop current in control coil 4 which will regenerate to a saturating condition. When stable saturation is established, current flows through the storage inductor 78 by way of resistor 79 as well as through control coil 4. If the product of the current times the inductance is greater in the storage inductance than in the control coil circuit, the former possesses more energy than the latter. If at such a time another pulse is applied through diode 80—81 which has sufficient duration, more energy is stored in both the storage inductor and the control coil. When the pulse subsides, the increased current continues to flow from rector 78 in such a direction as to sap the current from rectifier 80—81. This causes a net reduction in the current to control coil 4 to below that necessary to maintain stable saturation.

Figure 9:
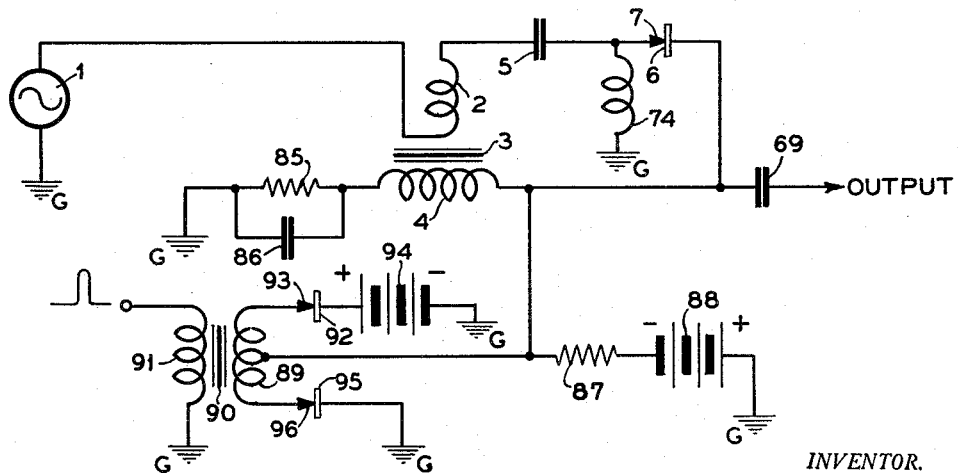
Fig. 9 shows a further modified form of binary counter.

Fig. 9 shows a binary counter stage with signal source 1 feeding signal coil 2 through capacitor 5 across inductor 74 and through rectifier 6—7 and capacitor 69 to the output. Saturation of core 3 is maintained once it is established by current from diode 6—7 flowing through control coil 4 and resistor 85 shunted by time constant determining capacitor 86. Actuating pulses are applied to primary 91 of pulse transformer 89—90—91. These pulses produce positive pulses at anode 93 of diode 92—93, cathode 92 of which is connected to bias source 94. The input pulse also produces a negative pulse at anode 96 of grounded diode 95—96. Residual current in control coil 4 is cancelled by current from source 88 through resistor 87. When saturation is absent, the center tap of secondary 89 is nearly at ground potential. A positive input pulse will cause current to be drawn through diode 95—96 which in turn will pass through control coil 4 to cause saturation. When saturation exists, secondary 89 is positive and storage capacitor 86 will be charged. A positive pulse across primary 91 under these conditions draws current through diode 92—93 which opposes the saturating current in control coil 4 lowering the voltage at the diode end of the control coil and initiating desaturation. Diode 6—7 and the signal circuit has sufficient impedance to permit this effect. Also condenser 86 holds its charge long enough to permit an appreciable reduction in control current.

Figure 10:
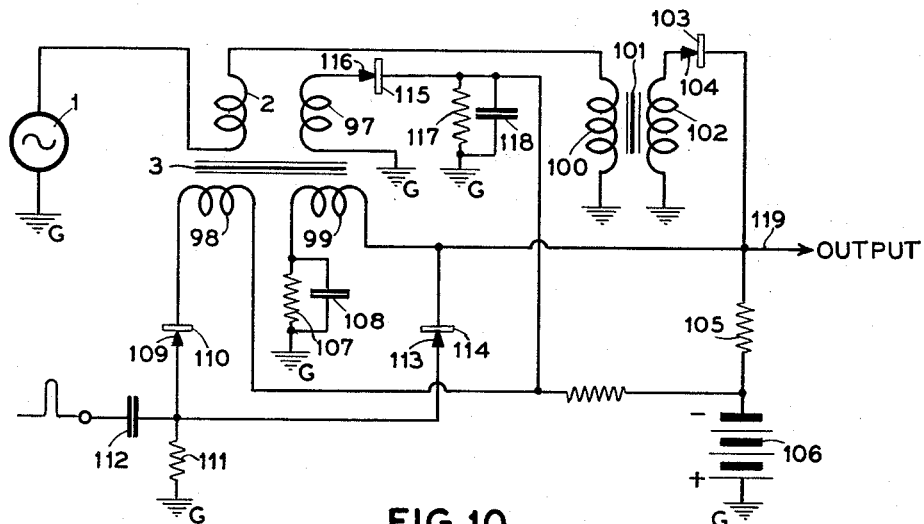
Fig. 10 shows a still further modified form of binary counter.

Fig. 10 shows a circuit in which output is derived over two different paths. One output is derived from signal current flowing from source 1 through signal coil 2, transformer 100—101—102 and rectifier 103—104 to output lead 119. The other output is derived from secondary 97 wound on core 3, through rectifier 115—119 across resistor 117 shunted by capacitor 118. When saturation exists, current from cathode 103 passes through control coil 99 and resistance-capacity storage circuit 107—108 which maintains saturation. When saturation is absent, the current from coil 97 passing through rectifier 115—116 raises the potential of second control coil 98 but no current flows due to rectifier 109—110. Positive input pulses through capacitor 112 across resistor 111 are impressed on anodes 109 and 113 of diodes 109—110 and 113—114. When saturation is absent, coil 99 is near ground potential and coil 98 has a positive potential. Hence, the incidence of a positive pulse passes current only through coil 99 setting up saturation conditions. If saturation is present, coil 99 is at a positive potential while coil 98 is near ground potential and a positive pulse passes a desaturating current through coil 98 and desaturation is initiated. Bias current flows from negative source 106 through resistors 105 and 120 to cancel residual currents which flow in their respective circuits when each has minimum output.

Figure 11:
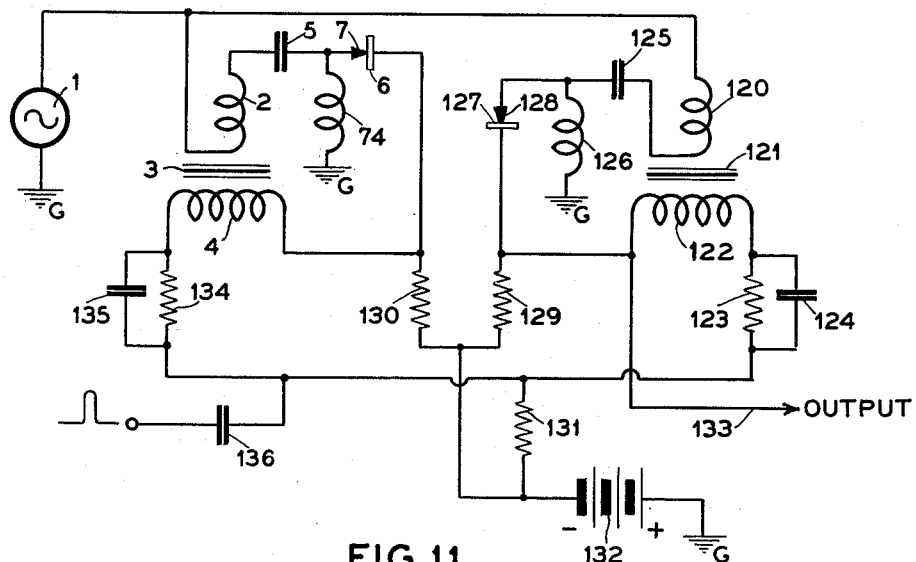
Fig. 11 shows still another modified form of binary counter.

Fig. 11 shows two saturable reactors 2—3—4 and 120—121—122.

The first is connected with signal source 1 and feeds through capacitor 5 across inductor 74 through rectifier 6—7, control coil 4 to resistor 134 shunted by first storage capacitor 135. The second is connected with signal source 1, through capacitor 135 across inductor 126, through rectifier 127—128, control coil 122, and resistor 123 shunted by storage capacitor 124. Control coil 4 is returned to a negative voltage point supplied by source 132 through resistor 130 and control coil 122 is returned to the same negative voltage supply through resistor 129. Residual current is cancelled by current from the negative supply through resistor 131. Output is taken over lead 133 from one end of control coil 122 and actuating pulses are fed to the common return of the two storage capacity through capacitor 136. This circuit constitutes a regenerative system with two saturable reactors each with a resistance capacitive time constant network connected to a common source of current from the negative supply. When one reactor is saturated, its associated storage condenser is charged while the other is not. A positive pulse applied at the point common to the two control circuits reduces current in the saturating control coil so that its signal current falls. When this input pulse subsides, the unchanged condenser in the formerly unsaturated reactor circuit causes its corresponding reactor to pick up current and reverse the original condition. Resistor 131 is low enough to supply saturating current for one and only one of the saturable reactors so that one and only one can be saturated at a time. Relatively little trigger energy is required with this circuit.

Figure 12:
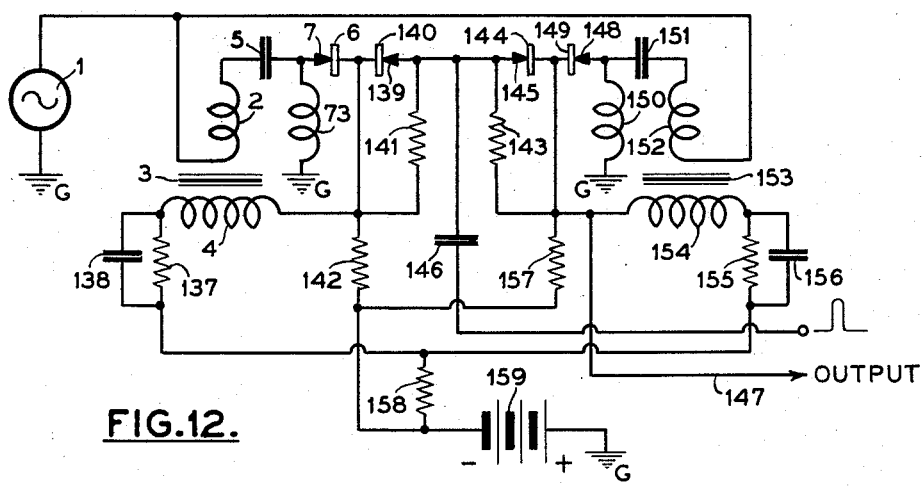
Fig. 12 shows another modified form of binary counter circuit.

Fig. 12 shows a two reactor circuit similar to Fig. 11 but with actuating pulses applied through diodes and requiring less triggering energy. The uncharged circuit, with this arrangement, starts to pick up current before the other starts to lose it. Reactor 2—3—4 is connected with signal source 1 and feeds through capacitor 5, across reactor 73 through rectifier 6—7, control coil 4 to resistor 137 shunted by time constant capacitor 138. Reactor 152—153—154 is connected with signal source 1 and feeds through capacitor 151 across reactor 150 and through rectifier 148—149, control coil 154 and resistor 155 shunted by time constant capacitor 156. Return of the two reactor circuits is made through bias resistors 142 and 157 to a negative voltage supply 159 to cancel residual currents of unsaturated outputs. Current from supply 159 is limited by resistor 158 to that necessary to saturate one and only one reactor. Actuating pulses are applied through capacitor 146 across resistor 141 and through rectifier 139—140 to reactor 2—3—4 and across resistor 143 and through rectifier 144—145 to reactor 152—153—154. Output is taken over lead 147.

Figure 13:
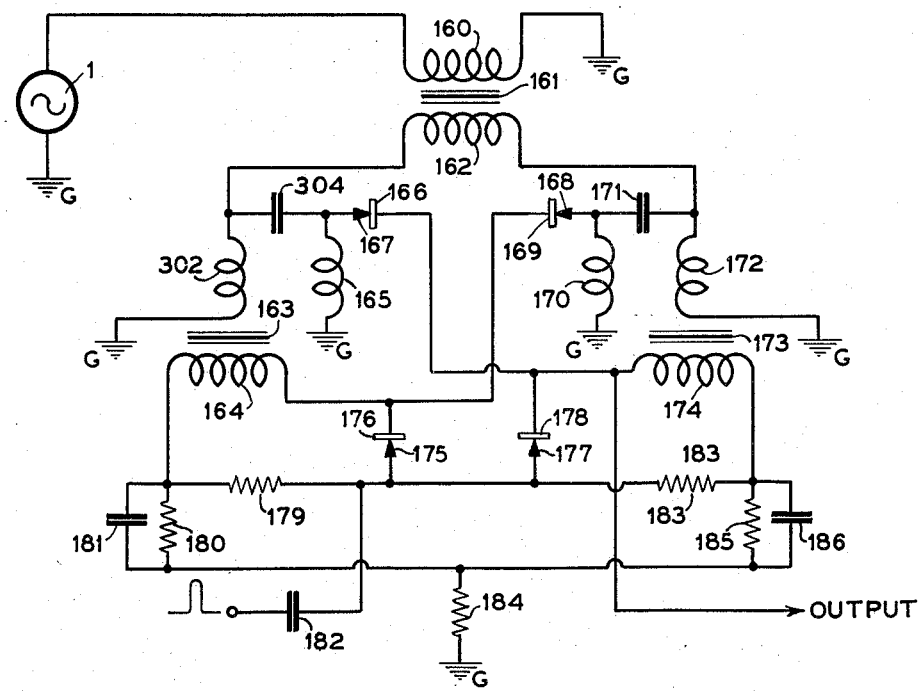
Fig. 13 shows still another modified form of binary counter circuit.

Fig. 13 shows a signal source 1 feeding transformer 160—161—162 which in turn drives reactors 163—164—302 and 172—173—174. Output from signal coil 302 goes through capacitor 304 across reactor 165, through rectifier 166—167 to control coil 174 and resistor 185 shunted by time constant capacitor 186. Signal coil 172 feeds through capacitor 171, across reactor 170 and through rectifier 168—169 to control coil 164 and resistor 180 shunted by time constant capacitor 181. Resistors 180 and 185 return through common resistor 184. Actuating pulses are applied through capacitor 182 to a common point from which branch resistor 179 to resistor 180, resistor 183 to resistor 185, rectifier 175—176 to coil 164 and rectifier 177—178 to coil 174. This then constitutes a balanced pair type counter in which a voltage is developed across the signal coil of the unsaturated element which produces current that keeps the other element saturated and inhibits its output. This system requires no bias source. It uses a rectifier coupled input. The high frequency signal is supplied through a transformer in which the secondary floats with one terminal connected to one reactor signal coil and the other terminal to the other signal coil. The remaining terminal of each signal coil is grounded. With this arrangement the signal coil which is saturated in effect grounds its terminal of the transformer secondary so that nearly all the voltage develops across the unsaturated signal coil. This circuit is very stable and the output of the saturated signal coil, which acts as a shunt, is so low that residual currents are negligible and do not have to be counteracted by a bias.

While only a few forms of the present invention have been shown and described, many modifications will be apparent to those skilled in the art and within the spirit and scope of the invention as set forth in particular in the appended claims.

What is claimed is:

1. In a signal control system, the combination of, a saturable reactor device including at least a saturable core, a signal winding coupled to said core, a control winding coupled to said core, a source of high frequency current for passing through said signal winding under control of the saturation condition of said core, a source of pulses for setting the saturation of said core, a rectifier for rectifying the high frequency current passed by said signal coil to provide direct current, and a regenerative circuit for applying at least a portion of said direct current to said control coil.

2. In a saturable reactor circuit, the combination of, a saturable reactor core, an aperiodic signal control circuit including a signal coil coupled to said core, a control coil coupled to said core, and a regenerative feedback circuit including a rectifier for passing holding current through said control coil in response to current passed by said signal coil.

3. In a saturable reactor circuit, the combination of, a saturable reactor core, a signal coil coupled to said core, a control coil coupled to said core, a regenerative feedback circuit including a rectifier for passing holding current through said control coil in response to current passed by said signal coil and a non-regenerative feedback circuit for passing a predetermined initial current opposed to said holding current through said control coil for substantially cancelling initial current flowing in said control coil.

References Cited in the file of this patent

UNITED STATES PATENTS

| | | |
|---|---|---|
| 2,729,755 | Steagal | Jan. 3, 1956 |
| 2,772,370 | Bruce et al. | Nov. 27, 1956 |